March 30, 1971  ETSUJI YUKI  3,573,059
METHOD OF PREVENTING THE DETERIORATION OF FRYING OILS IN FRYING
APPARATUSES AND A HOOD FOR USE ON SUCH APPARATUSES
Filed July 10, 1969  6 Sheets-Sheet 1

ETSUJI YUKI
*INVENTOR.*

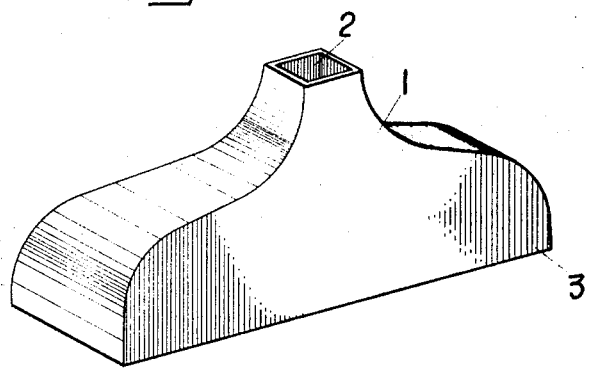
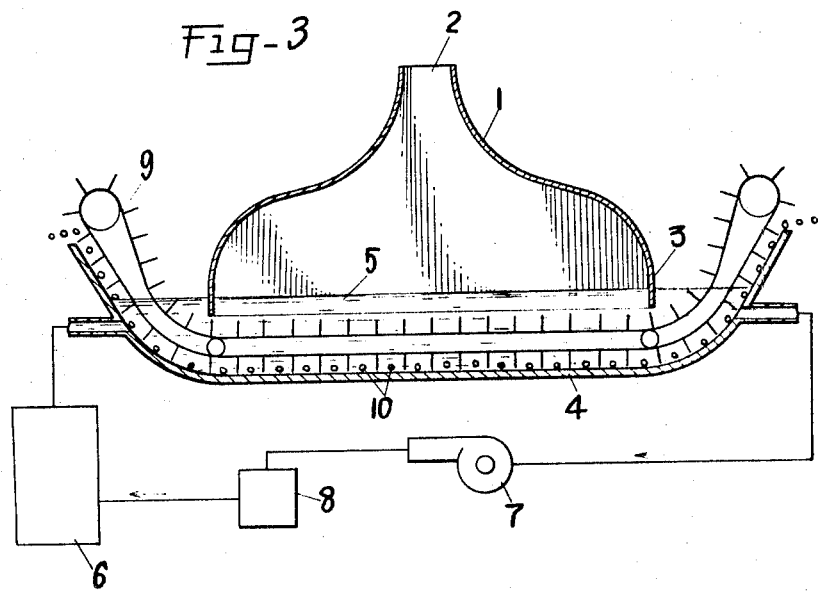

ETSUJI YUKI
*INVENTOR.*

ETSUJI YUKI
INVENTOR.

BY Wadworth, Lide Ponack
attys

United States Patent Office 3,573,059
Patented Mar. 30, 1971

3,573,059
METHOD OF PREVENTING THE DETERIORATION OF FRYING OILS IN FRYING APPARATUSES AND A HOOD FOR USE ON SUCH APPARATUSES
Etsuji Yuki, 1454 banchi, Aki-gun, Hiroshima-ken, Yano-machi, Japan
Continuation-in-part of application Ser. No. 700,920, Jan. 26, 1968. This application July 10, 1969, Ser. No. 860,130
Int. Cl. A47j 37/12
U.S. Cl. 99—1                                3 Claims

ABSTRACT OF THE DISCLOSURE

A method of preventing the deterioration of frying oils in a frying apparatus in which a roof-shaped or peaked hood is positioned over nearly all the surface of the oil in the frying pan in such a way that its bottom circumferential rim is submerged in the oil, thereby preventing the infiltration of air into the hood, and the vapor generated within the hood is discharged at a flow rate of from greater than 100 kg./m.$^2$ hr. to 10,000 kg./m.$^2$ hr. through a vapor outlet having a dimension chosen for securing the desired effect. The hood used for carrying out the method is equipped with a baffle for collecting condensed material so formed that water and oily material which is condensed on the inside wall surface of the hood where it is inclined upwardly from its bottom circumferential rim will flow down along the inclined inside wall surface of the hood and will be accumulated at the bottom circumferential rim, wherefrom it can be discharged from the apparatus.

This application is a continuation-in-part of application Ser. No. 700,920 filed Jan. 26, 1968, now abandoned.

BACKGROUND OF THE INVENTION

The present invention relates to a method of preventing the deterioration of frying oils in frying apparatuses.

Generally, the first problem inherent in frying apparatuses which are used to produce fried potato chips, doughnuts, fried beans and other fried foods, is how to provide a mechanism adaptable for producing such fried foods which have good quality, good uniformity, and with ease and in large quantities. To attain these objectives, many inventive efforts have heretofore been made, not only in automating the frying apparatuses, but also in contriving mechanisms for preparing, shaping and plunging into the oil the materials to be fried, transporting mechanisms, and so forth. The second problem is how to prevent deterioration of the frying oil which may take place in the frying pan. No matter how well the frying apparatus may be arranged and how completely automated, it is only natural that the fried foods of uniformly good quality cannot be obtained if the oil has deteriorated. To make matters worse, oil deterioration causes foaming discoloration and reduction in stability, to say nothing of loss of flavor, impairment of appearance of the food, and reduction in the adaptability for preservation.

This invention is addressed to the second problem of oil deterioration. More particularly, it is necessary to protect the surface of oil from air. This invention drives out the air in the hood by means of the steam generated from the material being fried by providing a roof-shaped or peaked hood over the surface of the oil. In this invention, to solve the problem of exclusion of air by means of steam, the dimensions of the steam outlet formed in the hood and the arrangement for collecting and draining the condensed material which may stick onto the inside wall surface of the hood has been studied in many ways with successful results.

The method heretofore devised to prevent thermal oxidation by protecting the surface of the oil from air is to cover the surface of the oil with a metal float. In this method, the evaporation of the free fatty acids formed in the oil is prevented, resulting in promotion of hydrolysis of the oil, and when this float is installed over all of the frying apparatus, the steam generated from the material to be fried may cause the oil to overflow.

In the surface protection of the oil by the use of the hood invented by Horace L. Smith, Jr., disclosed in U.S. Pat. No. 3,282,197, two stacks are provided in the front and rear of the hood so that the air entering the hood under the circumferential rim of the hood is directed to the stacks. Not only because the circumferential rim of the hood is spaced from the surface of the oil, but also because the amount of steam generated from the material being fried decreases in the latter stage of the operation of the frying apparatus, the effect of this method of exclusion of the air entering through the gap at the surface of the oil is imperfect.

SUMMARY OF THE INVENTION

The oil deterioration that takes place in the frying apparatus is generally believed to involve, in addition to the thermal oxidation, hydrolysis and heat polymerization and scission. The object of this invention is to prevent thermal oxidation, which has the greatest effect on the oil deterioration. Accordingly, the first object of this invention is to prevent this thermal oxidation by utilizing the steam generated from the material being fried and controlling the rate of discharge of the steam by the use of a hood so that no layer of air will be left on the surface of the oil.

The second object is to prevent the condensed material on the inside wall surface of the hood from dripping back into the oil, thereby preventing the oil from becoming contaminated and avoiding sudden boiling of the oil.

The first object is attained by providing a roof-shaped or peaked hood having a bottom peripheral rim immersed in the bath of frying oil and having the side walls inclined upwardly to the peak, at which point the walls define an exhaust opening which is designed to have a dimension such that the flow rate of steam generated by the food frying in the oil bath through the opening is more than 100 kg./m.$^2$ hr.

The second objective is attained by providing a baffle for the condensed materials in such a way that as the condensed materials flow down along the inclined surface toward the bottom of the inside wall, they are trapped and drained out of the apparatus.

BRIEF DESCRIPTION OF THE DRAWINGS

The invention will now be described in detail in connection with the accompanying drawings, in which:

FIG. 2 is a perspective view of the peaked hood;

FIG. 3 is a sectional view of an apparatus for carrying out a frying operation using the hood shown in FIG. 2, the mechanism for transporting the material to be fried, the pump, the filter, the heat exchanger, etc., being shown only schematically;

In making the present invention, the relationship between the flow-rate of the steam discharged from the hood and the thermal oxidation of oil has been examined. An oil deterioration test has been carried out by using soybean oil held at a definite temperature under conditions at which the rate of moisture vaporization was held at 0.25 kg. per hr. for each kg. of the oil; the oil turn-over rate was 1.5% per hr.; and the temperature was set at 180±2° C.; and a peaked hood was installed over nearly all the surface of the oil with the bottom circumferential rim of the hood submerged in the oil and the dimension of the steam outlet was chosen so as to have the flow rates of steam at 318, 141, 100 and 79 kg./m.² hr., respectively, at the same outlet. The results given in the table below were obtained.

| Flow rate of steam, kg./m.² hr. | Viscosity rise after 35 hours, percent | Drop in iodine value |
| --- | --- | --- |
| 318 | 3.6 | 1.0 |
| 141 | 7.6 | 1.3 |
| 100 | 11.0 | 2.0 |
| 79 | 18.4 | 4.5 |
| Open | 53.1 | 10.4 |

As is apparent from this table, when the flow rate of steam at the steam outlet is made higher than 100 kg./m.² hr., air in the hood is expelled, and consequently, the thermal oxidation of oil is substantially eliminated. Thus, the gist of this invention consists in completely submerging the bottom circumferential rim of the hood in the oil bath, as well as in setting the discharge velocity of the steam generated from the oil at a value higher than 100 kg./m.² hr. The upper limit of the flow rate is 10,000 kg./m.² hr., above which pressure in the hood causes the frying oil to overflow. The shape of the hood is not limited to the roof-shape or the peaked shape shown in the accompanying drawing. What is referred to herein as a roof-shaped hood is a hood covering nearly all the fryer with its bottom circumferential rim in an oblong rectangle and both its sides inclined upwardly from this bottom circumferential rim, and coming together at the top. The peaked shape is a shape for a hood to be employed on a relatively small fryer and having its bottom circumferential rim in a rectangle which is nearly square, or in a circle, with its wall being gradually inclined toward the steam outlet. The wall running from the bottom circumferential rim to the top should be inclined only to such a degree that the steam generated from the oil and other condensed materials do not drip back into the oil.

Furthermore, insulation is applied to the inclined wall of the hood for preventing the sticking of condensed material, and the steam from the oil is smoothly discharged through the steam outlet.

Figure 1:
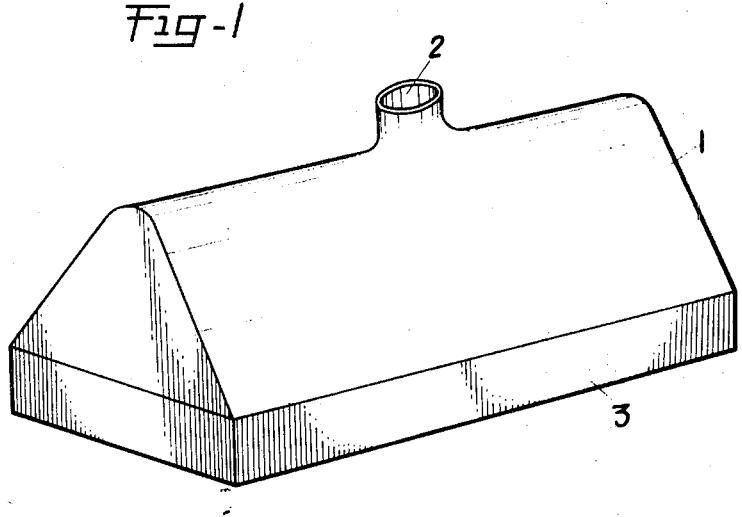
FIG. 1 is a perspective view of a roof-shaped hood.

In FIG. 1, the roof-shaped hood is shown, and in FIG. 2, the peaked hood is shown. The walls of the roof-shaped hood incline upwardly from the bottom circumferential rim to the top, and the steam outlet is formed at the center of the top. This steam outlet is designed so as to have a dimension such that the flow rate of steam is higher than 100 kg./m.² hr.

In FIG. 2, the peaked hood 1 has the steam outlet 2 formed at the top. The dimensions of this steam outlet 2 are such that the flow rate of the steam discharged from this steam outlet is higher than 100 kg./m.² hr. The hood has a bottom circumferential rim 3. An apparatus with a peaked hood is shown in FIG. 3. In FIG. 3, the frying pan 4 is filled with oil 5, the oil entering from one end of the frying pan, and flowing out of the other end, being circulated by a pump 7 through a filter 8 and a heat exchanger 6. A conveyor 9 conveys the materials 10 to be fried, such as potato chips, fried cookies, and other fried foods. As shown in FIG. 3, the peaked hood 1 is positioned with its bottom circumferential rim 3 submerged in the oil bath 5 so that no air can get into the inside of the hood from the outside. Accordingly, as the material 10 to be fried moves into the oil 5 on the conveyor 9, the steam generated flows up along the inclined surface of the peaked hood 1, and out through the steam outlet 2. At this time, since air outside the hood 1 is blocked off, the air within the hood 1 is discharged through the steam outlet simultaneously as the steam rises and fills the hood. When the dimensions of the steam outlet 2 are such that the flow rate of the steam discharged is higher than 100 kg./m.² hr., the oil deterioration is minimized, enabling the frying to be carried out with a fresh oil. That is to say, if a flow rate of steam higher than this value is used, air will be prevented from leaking into the inside of the hood through this steam outlet.

DESCRIPTION OF THE PREFERRED EMBODIMENT

While using soybean oil (acid value 0.06) as a test oil, pieces of potato cut in a 1 cm. cube were fried in an automatic test fryer of the type having indirect heating by a heat transfer liquid at the rate of 2.5 kg. of potatoes per hour for seven hours a day.

The frying conditions were: bath of oil 120 cm. long, 13 cm. wide, and 15 cm. deep heated to 180±2° C.; a conveyor was run through the bath at 12 cm./min.; the quantity of water vaporized was 0.165 kg./kg. oil/hr.; and the oil turnover rate was 2.2%/hr. In order to examine the effect on thermal oxidation by the use of the hood, a comparison was made between two conditions; in one case, the surface of the frying oil was open to the air, the air contact area being 0.014 m.²/kg., and in the other case, the air was shut out by using a hood as described above, the air contact area being .004 m.²/kg. in the area around the outside edge of the hood. The viscosity rise was noticeable when the surface of frying oil was open as indicated by the solid line in FIG. 9, the increase in acid value was also great, as shown by the solid line in FIG. 10; and, furthermore, a distinct difference was observed in foaming as is seen from the solid line in FIG. 11.

Figure 9:
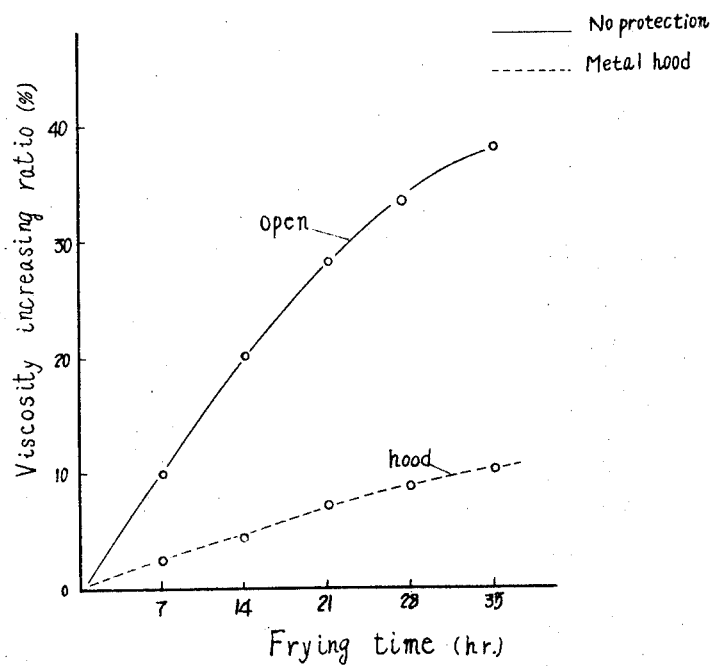
FIG. 9 is a graph showing a comparison between rise in viscosity, one for when the surface of the oil is open and the other for when the hood is used according to the invention.
Figure 10:
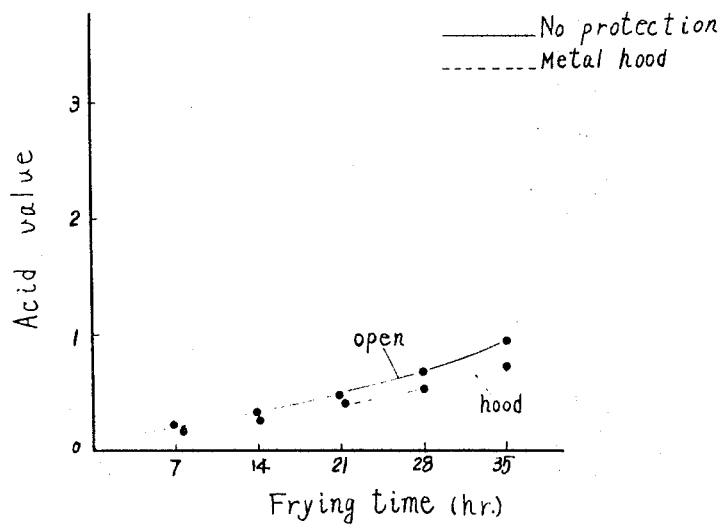
FIG. 10 is a graph showing a similar comparison of acid values.
Figure 11:
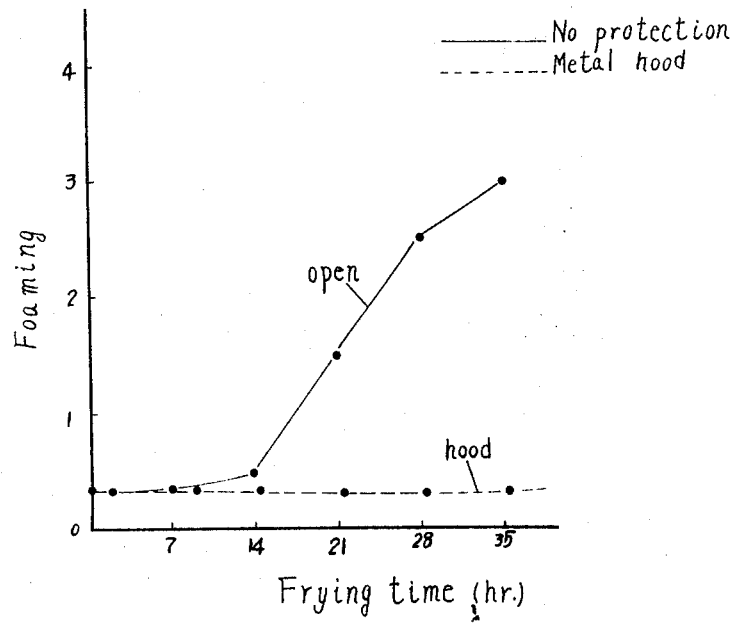
FIG. 11 is a graph showing a comparison of foaming conditions.

In the frying apparatus to which the hood according to this invention was applied, the results, with respect to the thermal oxidation of the frying oil, i.e. viscosity rise, acid value and foaming, were all better than for the oil bath open to the air, as also seen from the dotted lines in FIGS. 9–11.

By way of explanation, the opening at the top of the hood forming the steam outlet 2 must have a dimension so as to make the flow rate of steam 100 kg./m.² hr. While the bottom circumferential rim 3 of the hood shown in the figures is in the shape of a square or a rectangle, a circular or eliptical shape can also be used, depending on the shape of the fryer or the mechanism for transporting the material to be fried. However, this bottom circumferential rim should preferably be formed to lie as nearly to a flat plane as practicable, for it must be submerged in the frying oil in the fryer so that the inside of the hood will be airtight.

Figure 4:
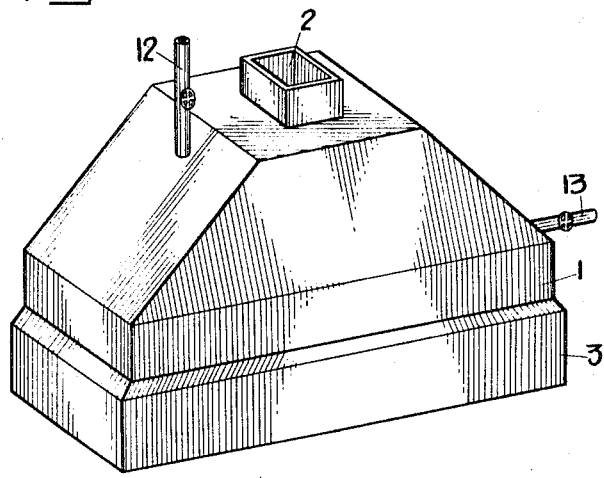
FIG. 4 is a perspective view of a hood, the outside surface of which is double layered so as to prevent the steam from condensing on the inside wall surface of the hood.
Figure 5:
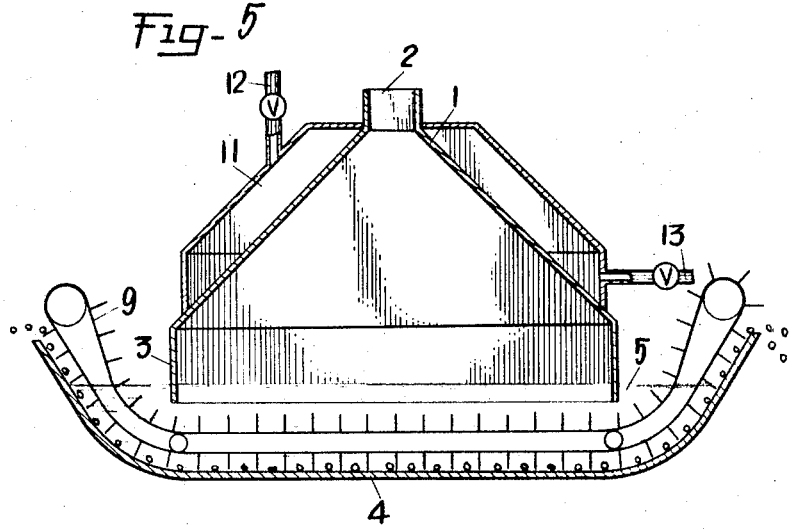
FIG. 5 is a cross-sectional view of the hood of FIG. 4 in a frying apparatus.

In the hood shown in FIGS. 4 and 5, the peaked-shaped hood is double walled along its outer surface to form a heating space 11 between outer wall 11a and the inner wall 11b. In this hood, because the hood can be heated to and held at a temperature higher than about 100° C. by providing the heating space along the outer surface of the hood, the steam which is vaporized from the surface of the frying oil rises along the inclined surface of the hood and then is discharged through the steam outlet 2 and is disposed of without being abruptly cooled down on the inside surface of the hood. Accordingly, the danger that condensed material will drip back into the frying oil, causing a sudden boiling, or that these condensed materials will act as catalysers to the frying oil for thermal oxidation or hydrolysis, can be guarded against. This effect in conjunction with the steam discharging effect of the peaked hood together prevent deterioration of the frying oil very satisfactorily. When a gas or a liquid medium is held in the heating space 11, this medium is heated by the steam rising on the inside surface, almost completely obviating the need for heating from the outside. The medium can be supplied through valve inlet 12 and discharged through valve outlet 13, and if necessary or desirable, can be preheated, or can be circulated continuously and heated by a heat exchanger.

Figure 6:
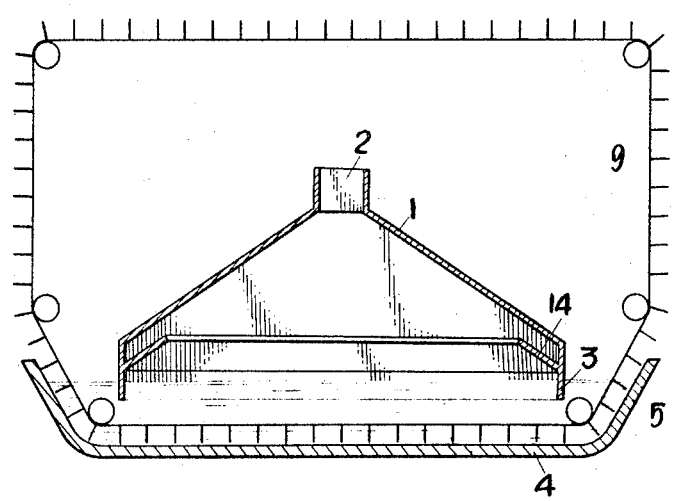
FIGS. 6 and 7 are sectional views of other forms of hoods in use.
Figure 7:
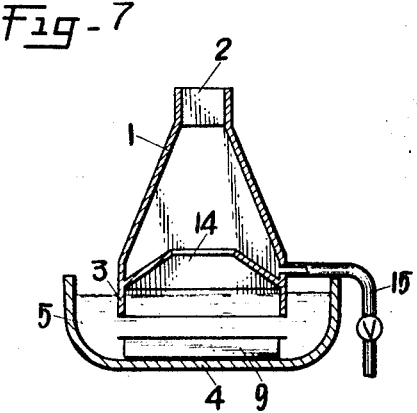

Regarding the hood illustrated in FIGS. 6 and 7, a baffle or receptacle 14 is formed at the bottom of the inside wall surface of the hood 1, so that the steam and other liquids condensed on the inside surface of the hood 1 will be trapped as they flow down along the inclined wall surface, and will be accumulated in the receptacle, and can then be drained out through the discharge port 15. By the use of this receptacle 14, the condensed materials are prevented from dripping back into the frying oil, the hydrolysis of the frying oil caused by the condensed oil materials is eliminated, and the occurrence of sudden boiling caused by the condensed water is prevented. The greater the inclination of the inside wall surface of the hood, the better the flowing-down of condensed materials. If the slope is higher than 20° with respect to the horizontal, a good result is obtained.

Figure 8:
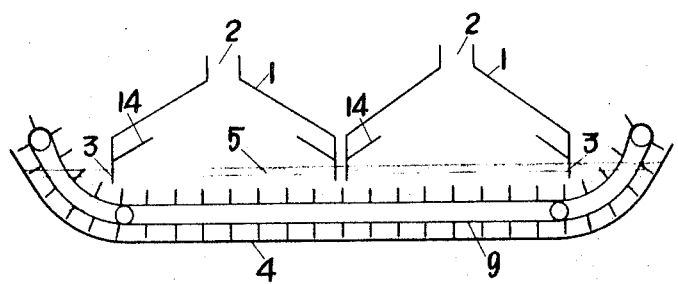
FIG. 8 is a cross-sectional view of two hoods employed in the same apparatus.

FIG. 8 illustrates an apparatus in which a plurality of hoods according to the invention are used side by side in the same apparatus. The plurality of hoods should be placed close to each other, thereby making the area of oil contacting the air as small as possible.

The roof-shaped or peaked hoods are respectively hung, or otherwise supported in such a way that each hood makes contact at its bottom with the surface of the frying oil bath, or is submerged therein so that the penetration of air from outside of the roof-shaped or peaked hood is prevented, and as a consequence, the air-tightness thereof is maintained.

While the invention has been described with particular emphasis on soybean oil, any other conventional frying oil can be used, such as cottonseed oil, corn oil and palm oil.

As described above, when the method and hood of this invention are used, the thermal oxidation of the frying oil is substantially completely prevented, the viscosity rise is controlled, the foaming can be subdued, and the frying oil is prevented from deteriorating. As a result, the frying of foods can be carried out with fresh oil for a long time. The use of the hood of this invention makes the achieving of the objects mentioned above easy, thereby greatly contributing to the improvement in the processing of fried foods.

What is claimed is:

1. A method of preventing the deterioration of frying oil during food frying comprising the steps of placing a hood having its side wall inclined upwardly from its bottom circumferential rim, and meeting at its top, and having a steam outlet at its top, with its bottom circumferential rim submerged in a frying oil bath to prevent penetration of outside air into the inside of the hood, said hood covering substantially all of the surface of the frying oil bath, frying food in the oil bath, and discharging steam which is generated within the hood and which rises along the inclined inside wall surface thereof through the steam outlet at a flow-rate greater than 100 kg./m.$^2$ hr. and up to 10,000 kg./m.$^2$ hr.

2. A method as claimed in claim 1 further comprising the steps of collecting the condensed materials which flow down along the inside wall surface of the hood and discharging the collected materials prior to the point at which they reach the frying oil bath.

3. A method as claimed in claim 1 further comprising the step of heating the walls of the hood by supplying heat thereto in addition to the heat supplied to the frying oil for frying the food to a temperature higher than 100° C. and maintaining the walls above 100° C.

References Cited

UNITED STATES PATENTS

| | | | |
|---|---|---|---|
| 2,678,599 | 5/1954 | Maddocks | 99—405 |
| 2,812,254 | 11/1957 | Smith | 99—100 |
| 2,853,937 | 9/1958 | Peck | 99—404 |
| 3,282,197 | 11/1966 | Smith | 99—405 |
| 3,353,962 | 11/1967 | Smith | 99—100 |

FRANK W. LUTTER, Primary Examiner

W. L. MENTLIK, Assistant Examiner

U.S. Cl. X.R.

99—404, 407